(12) United States Patent
Liu et al.

(10) Patent No.: US 9,897,433 B2
(45) Date of Patent: Feb. 20, 2018

(54) METHOD AND SYSTEM FOR REGIONAL PHASE UNWRAPPING WITH PATTERN-ASSISTED CORRECTION

(71) Applicant: KLA-Tencor Corporation, Milpitas, CA (US)

(72) Inventors: Helen Liu, Milpitas, CA (US); Xuan Zhao, Milpitas, CA (US); Xiaowei Li, Milpitas, CA (US)

(73) Assignee: KLA—Tencor Corporation, Milpitas, CA (US)

( * ) Notice: Subject to any disclaimer, the term of this patent is extended or adjusted under 35 U.S.C. 154(b) by 79 days.

(21) Appl. No.: 14/980,215

(22) Filed: Dec. 28, 2015

(65) Prior Publication Data

US 2017/0241764 A1   Aug. 24, 2017

Related U.S. Application Data

(60) Provisional application No. 62/248,779, filed on Oct. 30, 2015.

(51) Int. Cl.
*G01B 9/02* (2006.01)
*G01B 11/06* (2006.01)
*G01B 11/24* (2006.01)

(52) U.S. Cl.
CPC ..... *G01B 9/02083* (2013.01); *G01B 9/02078* (2013.01); *G01B 9/02088* (2013.01);
(Continued)

(58) Field of Classification Search
None
See application file for complete search history.

(56) References Cited

U.S. PATENT DOCUMENTS 5,837,169 A * 11/1998 Rourke ............. G02B 6/02095
264/1.27
6,359,692 B1   3/2002 Groot
(Continued)

OTHER PUBLICATIONS

Huntley et al., "Temporal phase-unwrapping algorithm for automated interferogram analysis," Applied Optics, vol. 32, No. 17, Jun. 10, 1993.*
(Continued)

*Primary Examiner* — Matthew Bella
*Assistant Examiner* — Soo Shin
(74) *Attorney, Agent, or Firm* — Suiter Swantz pc llo

(57) ABSTRACT

A wafer metrology system includes an interferometer subsystem and a controller. The interferometer sub-system is configured to generate an interferogram with an intensity map that corresponds to a modulated representation of a wafer surface. Further, the interferometer sub-system includes a detector configured to capture the interferogram. The controller includes one or more processors configured to generate a wrapped phase map of the interferogram, define patterns associated with features on the wafer, and correct phase discontinuities by applying a phase unwrapping procedure to the wrapped phase map to generate an unwrapped phase map and correcting phase discontinuities in the unwrapped phase map based on the patterns, or by combining phase unwrapping and correction in a unified step. Further, the patterns comprise two or more structures such that a portion of the unwrapped phase map associated with structures of the same type is continuous across borders separating structures of the same type.

34 Claims, 12 Drawing Sheets

(52) U.S. Cl.
CPC ...... *G01B 11/0608* (2013.01); *G01B 11/2441* (2013.01); *G01B 2210/56* (2013.01)

(56) References Cited

U.S. PATENT DOCUMENTS

| | | | |
|---|---|---|---|
| 6,847,458 B2 | 1/2005 | Freischlad et al. | |
| 8,643,847 B1 * | 2/2014 | Chen | G01B 9/0203 |
| | | | 356/511 |
| 8,949,057 B1 | 2/2015 | Seong et al. | |
| 9,121,684 B2 | 9/2015 | Tang et al. | |
| 2003/0035118 A1 | 2/2003 | Clark | |
| 2010/0195113 A1 * | 8/2010 | Lee | G01B 11/2441 |
| | | | 356/511 |
| 2014/0134755 A1 * | 5/2014 | Cheng | G02F 1/136259 |
| | | | 438/4 |

OTHER PUBLICATIONS

Desmangles, "Extension of the fringe projection method to large objects for shape and deformation measurement," Ph.D. Thesis No. 2734, Ecole Polytechnique Fédérale de Lausanne, 2003.*

Heshmat et al., "Reliable phase unwrapping algorithm based on rotational and direct compensators," Applied Optics, vol. 50, No. 33, Nov. 20, 2011.*

Greivenkamp, "Resolving Interferometric Step Height Measurement Ambiguities Using a Priori Information," SPIE vol. 1164 Surface Characterization and Testing II, 1989.*

J. Bioucas-Dias et al., Phase unwrapping via graph cuts, IEEE Transactions on Image Processing, vol. 16, No. 3, pp. 698-709, Mar. 2007.

* cited by examiner

METHOD AND SYSTEM FOR REGIONAL PHASE UNWRAPPING WITH PATTERN-ASSISTED CORRECTION

CROSS-REFERENCE TO RELATED APPLICATION

The present application claims the benefit under 35 U.S.C. § 119(e) of U.S. Provisional Application Ser. No. 62/248,779, filed Oct. 30, 2015, entitled METHOD AND SYSTEM FOR REGIONAL PHASE UNWRAPPING WITH PATTERN-ASSISTED CORRECTION, naming Helen Liu, Xuan Zhao and Xiaowei Li as inventors, which is incorporated herein by reference in the entirety.

TECHNICAL FIELD

The present disclosure relates generally to the field of phase unwrapping algorithms, and in particular, to phase unwrapping of a patterned surface with known discontinuities.

BACKGROUND

Many optical inspection tools utilize interferometric techniques to characterize the surface profile of a sample. A typical interferometer in a wafer inspection system coherently combines light reflected from a wafer surface with light reflected from a reference flat to generate an interferogram containing interference fringes associated with constructive and destructive interference of the light. The intensity of the interferogram is a sinusoidal modulation of the surface height, assuming top surface reflection. Specifically, a variation of surface height equal to one-half the wavelength of the light corresponds to one period of intensity modulation on the interferogram. Phase unwrapping algorithms generate a height map of the wafer from the modulated interferogram. However, the application of interferometric techniques to the characterization of patterned wafers presents unique challenges due to variations on the wafer surface including discontinuous jumps in the surface profile and the presence of thin films. Therefore, it is desirable to provide a method and system that cures the defects identified above in previous approaches.

SUMMARY

A method for performing regional phase unwrapping with pattern-assisted correction is disclosed, in accordance with one or more illustrative embodiments of the present disclosure. In one illustrative embodiment, the method includes acquiring a wrapped phase map of an interferogram. In another illustrative embodiment, an intensity map of the interferogram corresponds to a modulated representation of a wafer surface. In another illustrative embodiment, the method includes applying a phase unwrapping procedure to the wrapped phase map to generate an unwrapped phase map. In another illustrative embodiment, the unwrapped phase map includes one or more phase discontinuities associated with phase unwrapping errors. In another illustrative embodiment, the method includes defining one or more patterns in the unwrapped phase map. In another illustrative embodiment, the one or more patterns comprise two or more structures. In another illustrative embodiment, a portion of the unwrapped phase map associated with two or more structures of a same type is continuous across one or more borders separating the two or more structures. In another illustrative embodiment, the method includes correcting the phase discontinuities in the unwrapped phase map based on the one or more patterns.

A wafer metrology system with region phase unwrapping with pattern-assisted correction is disclosed, in accordance with one or more illustrative embodiments of the present disclosure. In one illustrative embodiment, the system includes an interferometer sub-system configured to generate an interferogram. In another illustrative embodiment, the interferometer sub-system includes a detector configured to capture the interferogram. In another illustrative embodiment, an intensity map of the interferogram corresponds to a modulated representation of a wafer surface. In another illustrative embodiment, the system includes a controller communicatively coupled to the detector. In another illustrative embodiment, the controller includes one or more processors configured to generate an unwrapped phase map with pattern-assisted corrections. In another illustrative embodiment, the one or more processors are configured to execute one or more instructions. In another illustrative embodiment, the processors are configured to generate a wrapped phase map of the interferogram. In another illustrative embodiment, the processors are configured to apply a phase unwrapping procedure to the wrapped phase map to generate an unwrapped phase map. In another illustrative embodiment, the unwrapped phase map includes one or more phase discontinuities associated with phase unwrapping errors. In another illustrative embodiment, the processors are configured to define one or more patterns on the unwrapped phase map associated with one or more features on the wafer, wherein the one or more patterns comprise two or more structures. In another illustrative embodiment, a portion of the unwrapped phase map associated with two or more structures of a same type is continuous across one or more borders separating the two or more structures. In another illustrative embodiment, the processors are configured to correct the phase discontinuities in the unwrapped phase map based on the one or more patterns.

A wafer metrology system with pattern-assisted phase unwrapping is disclosed, in accordance with one or more illustrative embodiments of the present disclosure. In one illustrative embodiment the system includes an interferometer sub-system configured to generate an interferogram. In another illustrative embodiment, the interferometer sub-system includes a detector configured to capture the interferogram, wherein an intensity map of the interferogram corresponds to a modulated representation of a wafer surface. In another illustrative embodiment, the system includes a controller communicatively coupled to the detector. In another illustrative embodiment, the controller includes one or more processors configured to generate an unwrapped phase map. In another illustrative embodiment, the one or more processors are configured to generate a wrapped phase map of the interferogram. In another illustrative embodiment, the one or more processors are configured to define one or more patterns on the wrapped phase map associated with one or more features on the wafer. In another illustrative embodiment, the one or more patterns comprise two or more structures. In another illustrative embodiment, a portion of the wrapped phase map associated with two or more structures of a same type is continuous across one or more borders separating the two or more structures. In another illustrative embodiment, the one or more processors are configured to correct the phase discontinuities in the wrapped phase map based on the one or more patterns.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1 through 10B, a system and a method for unwrapping the phase of an interferogram of a patterned wafer using regional unwrapping with pattern assisted correction is disclosed, in accordance with one or more embodiments of the present disclosure. Embodiments of the present disclosure are directed to pattern-assisted corrections of phase discontinuities associated with phase unwrapping. In this regard, corrections of phase discontinuities are applied to patterns with known continuity conditions such that phase unwrapping may be applied to complex patterned structures. Additional embodiments are directed to performing regional phase unwrapping such that an interferogram is divided into one or more block regions, phase corrections are applied separately to the one or more overlapping block regions, and relative phase between the one or more block regions is adjusted.

It is recognized that many phase unwrapping algorithms assume a certain smoothness and/or homogeneity of a target surface that is often violated for patterned wafer targets. Embodiments of the present disclosure are directed to utilizing known information regarding patterns on a target surface to enable accurate phase unwrapping of a wide range of surfaces common to semiconductor manufacturing.

Figure 1:
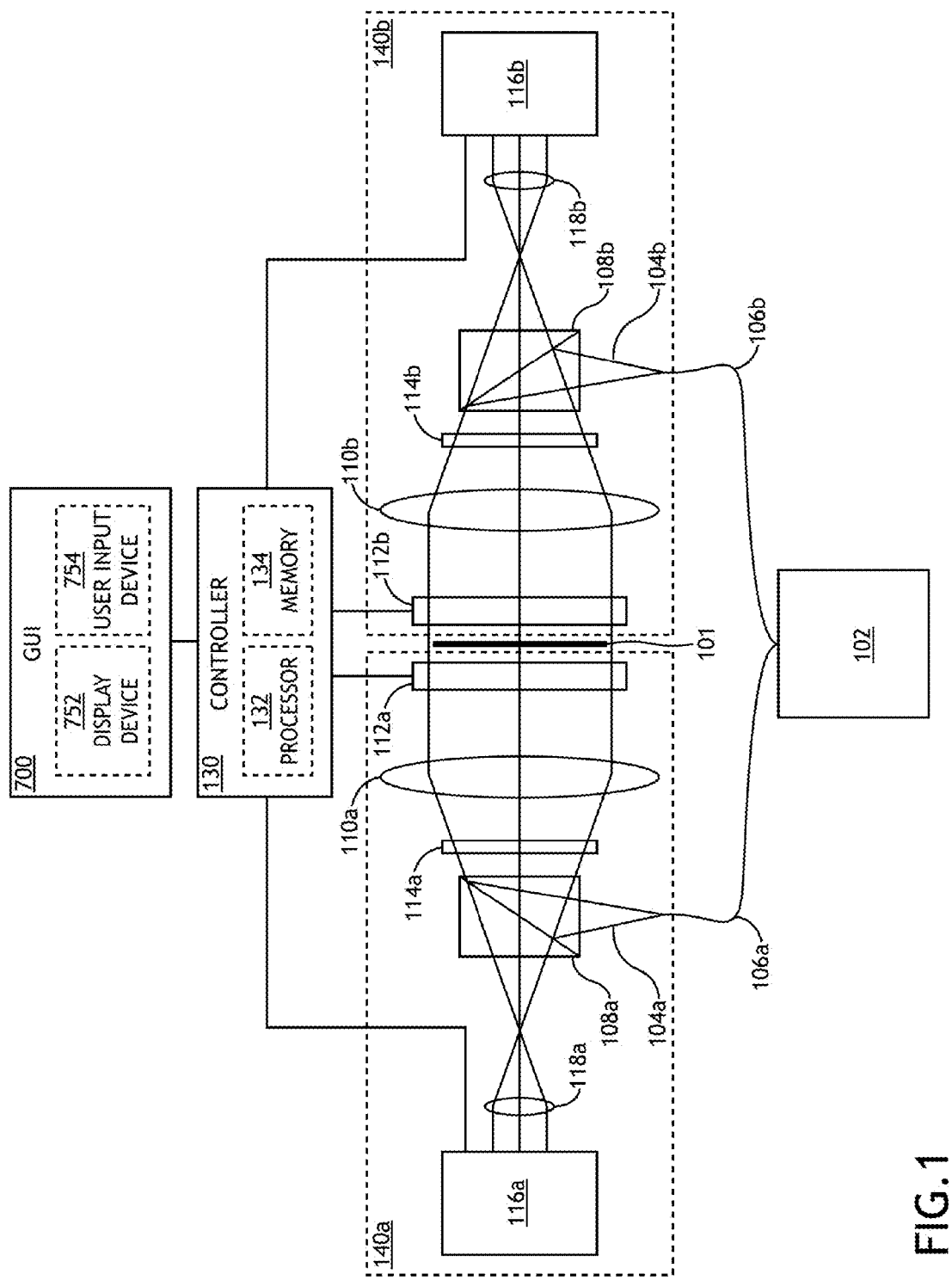
FIG. 1 is a simplified schematic of an interferometry system for generating an interferogram of two sides of a wafer, in accordance with one embodiment of the present disclosure.

FIG. 1 illustrates a simplified schematic of a double-sided Fizeau interferometer system 100 suitable for simultaneously characterizing two sides of a wafer 101, in accordance with one or more embodiments of the present disclosure. The use of Fizeau interferometry for wafer characterization is generally described in U.S. Pat. No. 6,847,458, filed on Mar. 20, 2003; U.S. Pat. No. 8,949,057, filed on Oct. 27, 2011; and U.S. Pat. No. 9,121,684. filed on Jan. 15, 2013, which are incorporated herein in their entirety.

In one embodiment, the system 100 includes an illumination source 102 configured to generate a coherent beam of illumination 104a/104b of a selected wavelength. For example, the illumination source 102 may include, but is not limited to, any source capable of emitting illumination in the range of approximately 300 nm to 1500 nm. The illumination source 102 may emit a beam 104a/104b into free space or into an optical fiber (e.g. 106a/106b) suitable for directing the beam to an interferometer 140a/140b. In one embodiment, the illumination source 102 is a fiber laser. In another embodiment, the illumination source 102 is a fiber-coupled light source. In one embodiment, the illumination source 102 is a fiber-coupled semiconductor laser with a wavelength of 635 nm.

In one embodiment, the system 100 includes two interferometers 140a/140b configured to simultaneously characterize two sides of a wafer 101. The two interferometers 140a/140b operate in substantially the same manner. In one embodiment, a beam 104a/104b is incident on a partially reflective reference flat 112a/112b. A first portion of the beam 104a/104b (the reference beam) reflects off of the reference flat surface and a second portion of the beam 104a/104b (the sample beam) propagates further and reflects off of a wafer 101. The reference beam and the sample beam recombine at the reference flat 112a/112b and propagate together to a detector 116a/116b that captures the interference pattern between the beams (i.e. the interferogram). In this way, the modulated intensity of the interferogram is associated with variations of the optical path of the sample beam. It is noted herein that variations of the optical path may be, but are not limited to be, due to variations in sample height (e.g. due to the presence of a pattern) or variations in the refractive index along the path of the sample beam.

In one embodiment, a polarizing beam splitter 104a/104b and a quarter-wave plate 114a/114b direct the beam 104a/104b to the reference flat 112a/112b and the wafer 101 at a substantially normal incidence angle. A beam 104a/104b reflected by the polarizing beam splitter 108a/108b propagates towards the wafer 101 and is linearly polarized in a first direction. The quarter-wave plate 114a/114b converts the linear polarization to a circular polarization. It is noted herein that the handedness of a circularly polarized beam switches (e.g. from left circular polarization to right circular polarization) upon reflection at a surface. Thus, the quarter-wave plate 114a/114b converts the circular polarization of the sample beam reflected from the wafer 101 to a linear polarization oriented orthogonal to the first direction. In this way, the sample beam propagates through the polarizing beam splitter 108a/108b to the detector 116a/116b. The reference beam, generated by a reflection from the reference flat 112a/112b, propagates through the quarter-wave plate 114a/114b and the polarizing beam splitter 108a/108b to the detector 116a/116b in a similar way.

One or more lenses 110a/110b may be located prior to the reference flat 112 to modify the diameter of the beam 104a/104b. In one embodiment, one or more lenses 110a/110b collimate a diverging beam 104a/104b. In another embodiment, one or more lenses 110a/110b expands the size of the beam 104a/104b to be larger than an inspected region of the wafer 101. In one embodiment, one or more relay lenses 118a/118b generate an interferogram on the detector 116a/116b such that interference fringes are overlaid on an image of the wafer 101.

Multiple interferograms may be generated by the system 100 to determine the relative height of one or more locations on a wafer 101. In this way, the system 100 may operate as a phase-shifting interferometer. It is noted herein that the multiple interferograms may be generated by any method known in the art. In one embodiment, multiple interferograms are generated by capturing multiple interferograms by a detector 116a/116b while translating a reference flat 112a/112b in a direction normal to the wafer 101. In another embodiment, multiple interferograms are generated by capturing multiple interferograms by a detector 116a/116b while a frequency of the beam 104a/104b generated by the illumination source 102 is swept.

It is noted herein that the set of optics of system 100 as described above and illustrated in FIG. 1 are provided merely for illustration and should not be interpreted as limiting. It is anticipated that a number of equivalent or additional optical configurations may be utilized within the scope of the present disclosure. It is anticipated that one or more optical elements including, but not limited to circularly symmetric lenses, cylindrical lenses, beam shapers, mirrors, waveplates, polarizers or filters may be placed in the system 100.

In one embodiment, the system 100 includes a controller 130 communicatively coupled to the detectors 116a/116b. In another embodiment, the system 100 includes a controller 130 further communicatively coupled to one or more translation stages (not shown) configured to translate one or more reference flats 112a/112b. In another embodiment, the system 100 includes a controller 130 further communicatively coupled to the illumination source 102 to control the frequency of the beam 104a/104b.

In one embodiment, the controller 130 includes one or more processors 132. In another embodiment, the one or more processors 132 are configured to execute a set of program instructions maintained in a memory medium 134, or memory. The one or more processors 132 of a controller 130 may include any processing element known in the art. In this sense, the one or more processors 132 may include any microprocessor-type device configured to execute algorithms and/or instructions. In one embodiment, the one or more processors 132 may consist of a desktop computer, mainframe computer system, workstation, image computer, parallel processor, or any other computer system (e.g., networked computer) configured to execute a program configured to operate the system 100, as described throughout the present disclosure. It is further recognized that the term "processor" may be broadly defined to encompass any device having one or more processing elements, which execute program instructions from a non-transitory memory medium 134.

The memory medium 134 may include any storage medium known in the art suitable for storing program instructions executable by the associated one or more processors 132. For example, the memory medium 134 may include a non-transitory memory medium. As an additional example, the memory medium 134 may include, but is not limited to, a read-only memory, a random access memory, a magnetic or optical memory device (e.g., disk), a magnetic tape, a solid state drive and the like. It is further noted that memory 134 may be housed in a common controller housing with the one or more processors 132. In one embodiment, the memory 134 may be located remotely with respect to the physical location of the one or more processors 132 and controller 130. For instance, the one or more processors 132 of controller 130 may access a remote memory (e.g., server), accessible through a network (e.g., internet, intranet and the like). Therefore, the above description should not be interpreted as a limitation on the present invention but merely an illustration.

In one embodiment, the memory medium 134 is configured to store one or more interferograms of one or more wafers 101. In another embodiment, the memory medium 134 is configured to store program instructions associated with regional phase unwrapping with pattern-assisted corrections for generating one or more surface height maps of one or both sides of one or more wafers 101.

In one embodiment, the system 100 includes one or more display devices 752 and one or more user input devices 754 communicatively coupled to the one or more processors 132. In this way, the one or more display devices 752 and the one or more user input devices 754 operate as a graphical user interface (GUI). In another embodiment, the one or more processors are configured to receive signals indicative of user input.

The intensity of an interferogram, I, may be expressed by equation 1:

$$I(x,y)=a(x,y)+b(x,y)\cos[\phi(x,y)+\text{const}] \quad (1)$$

where $\phi$ is the optical path of the sample beam, a background level and fringe modulation are represented by a, and b, respectively. The surface height, h, of the wafer 101 is related to the optical path of the sample beam, $\phi$, by equation 2:

$$h(x, y) = \frac{\lambda}{4\pi n(x, y)}\phi(x, y) \quad (2)$$

where $\lambda$ is the wavelength of the beam 104a/104b and n is the refractive index of the medium between the reference flat 112a/112b and the wafer 101. In this way, the surface height, h, is directly proportional to the optical phase, $\phi$, of the sample beam. However, since the intensity, I, of the interferogram is proportional to the cosine of the optical phase, $\phi$, the optical phase is effectively modulated by $2\pi$ due to the periodic nature of the cosine function. The optical phase, $\phi$, may then be described by equation 3:

$$\phi(x,y)=\psi(x,y)+2\pi N(x,y), \psi\in[0,2\pi] \quad (3)$$

where $\psi$ is the "wrapped phase", the $2\pi$ modulus of the true optical phase, $\phi$. N is the number of times the optical phase is modulated by $2\pi$. Thus, the modulated intensity of the interferogram provides the wrapped phase, psi, rather than the true optical phase.

Figure 2:
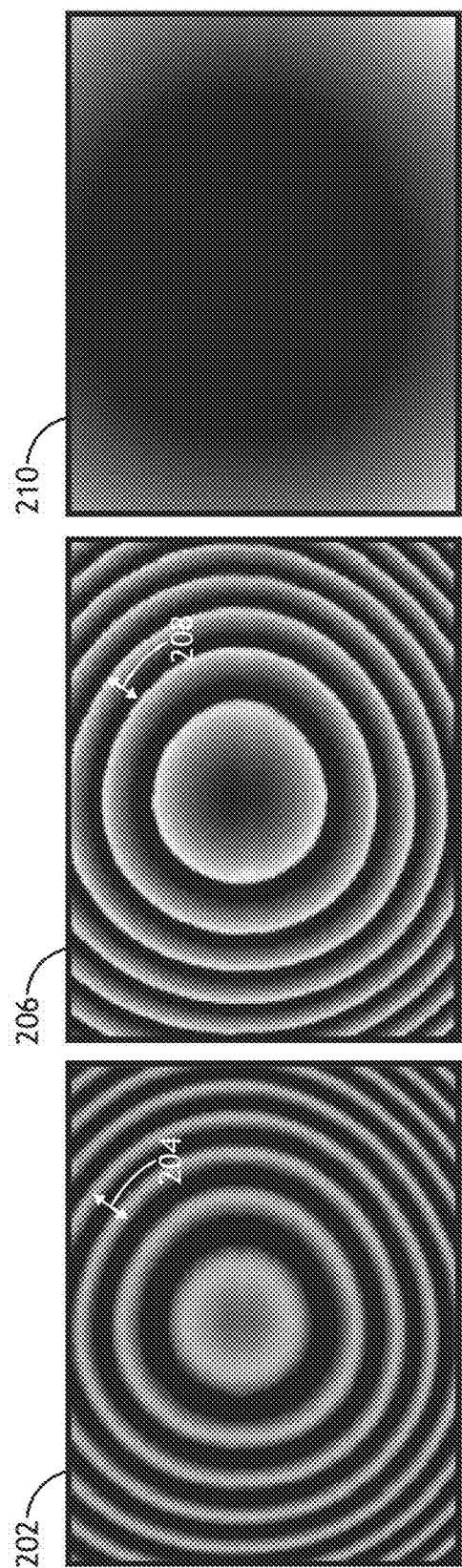
FIG. 2 is a series of images depicting the generation of a wrapped phase map and an unwrapped phase map, in accordance with one embodiment of the present disclosure.
Figure 3:
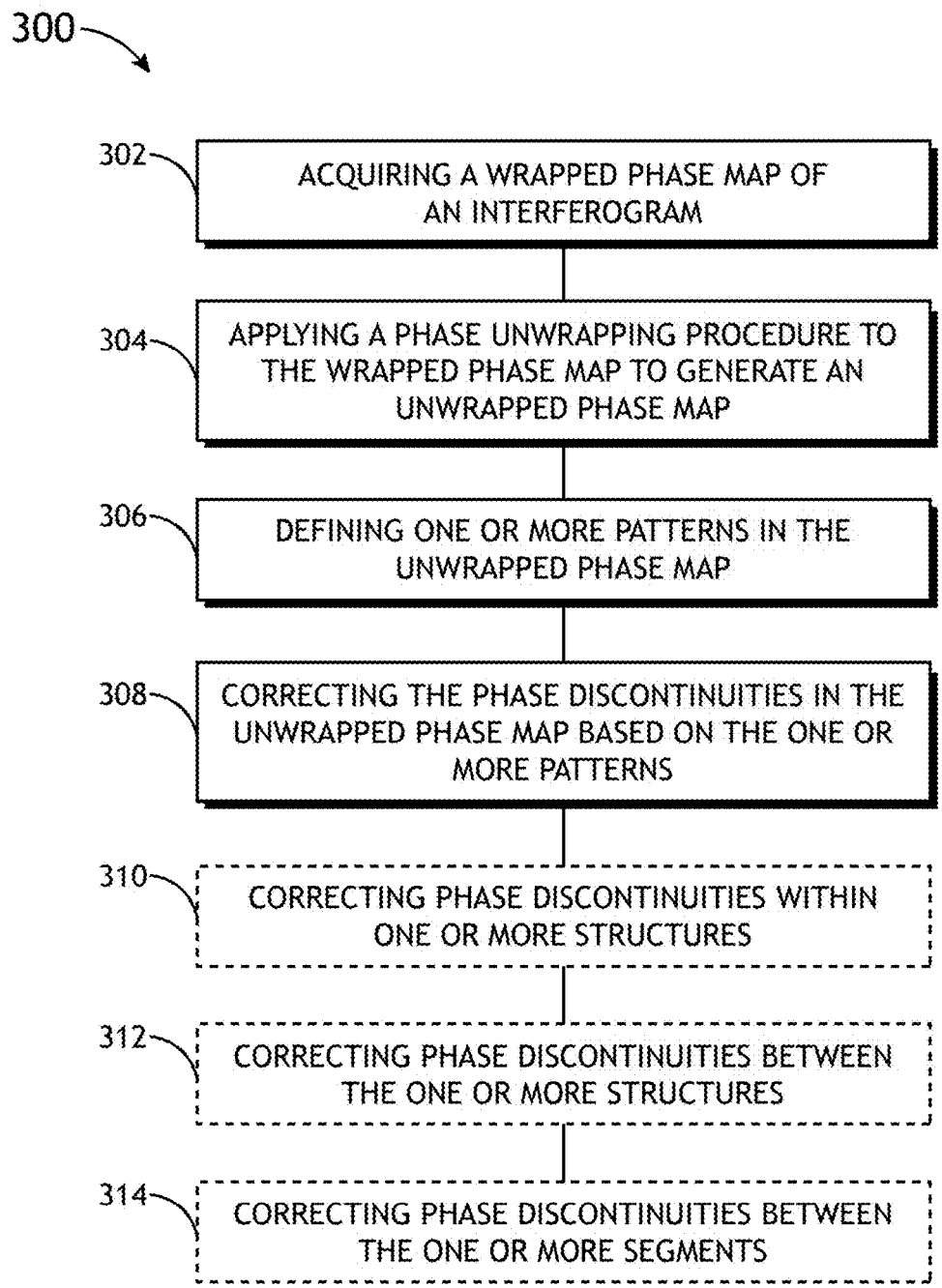
FIG. 3 is a flow diagram illustrating regional phase unwrapping with pattern-assisted corrections, in accordance with one embodiment of the present disclosure.

It is noted herein that one goal of phase unwrapping is to correct phase discontinuities associated with the wrapped phase map by determine N in order to generate a surface height map of the wafer 101. FIG. 2 illustrates the phase unwrapping process for a continuous surface (e.g. an unpatterned wafer) with a depression. An interferogram 202 contains a pattern of concentric fringes with a period 204. Over the length of the period 204, the intensity is sinusoidally modulated such that the intensity is continuous between adjacent periods. A map of the wrapped phase 206, ψ, may be generated by combining equations 1 and 3 and solving for ψ. Over the length of the period 208, the wrapped phase map varies from 0 to 2π with sharp discontinuities at transitions between adjacent periods. An unwrapped phase map 210 of the true phase, φ, is free of the discontinuities associated with the wrapped phase and is proportional to a surface height map of the wafer 101 according to equations 2 and 3.

It is noted herein that unwrapping the phase of an interferogram for a continuous surface may be accomplished by applying a continuity condition to the wrapped phase and adding (or subtracting) 2π across discontinuities in the wrapped phase map. It is further noted that this technique is not suitable for a wafer 101 with a patterned surface containing large (relative to one-half the wavelength of the beam 104a/104b) discontinuities associated with patterned structures.

FIGS. 3 through 10 illustrate regional phase unwrapping with pattern assisted correction of a surface of a wafer 101, in accordance with one or more embodiments of the present disclosure. In step 302, in one embodiment, a wrapped phase map of a wafer 101 is obtained, wherein the wrapped phase map corresponds to a modulated representation of the height of the wafer 101. The wrapped phase map may be obtained by any technique known in the art, such as, but not limited to, a Fizeau interferometer.

In one embodiment, in step 304, a phase unwrapping procedure is applied to the wrapped phase map to generate an unwrapped phase map, in accordance with one or more embodiments of the present disclosure. It is further noted that any phase unwrapping procedure known in the art suitable for unwrapping the wrapped phase map of may be used. For example, phase unwrapping procedures such as, but not limited to minimum norm, path following, Flynn Minimum Discontinuity, Quality Guided Phase Unwrapping, or Phase Unwrapping via Max Flows (PUMA) may be used.

Figure 4A:
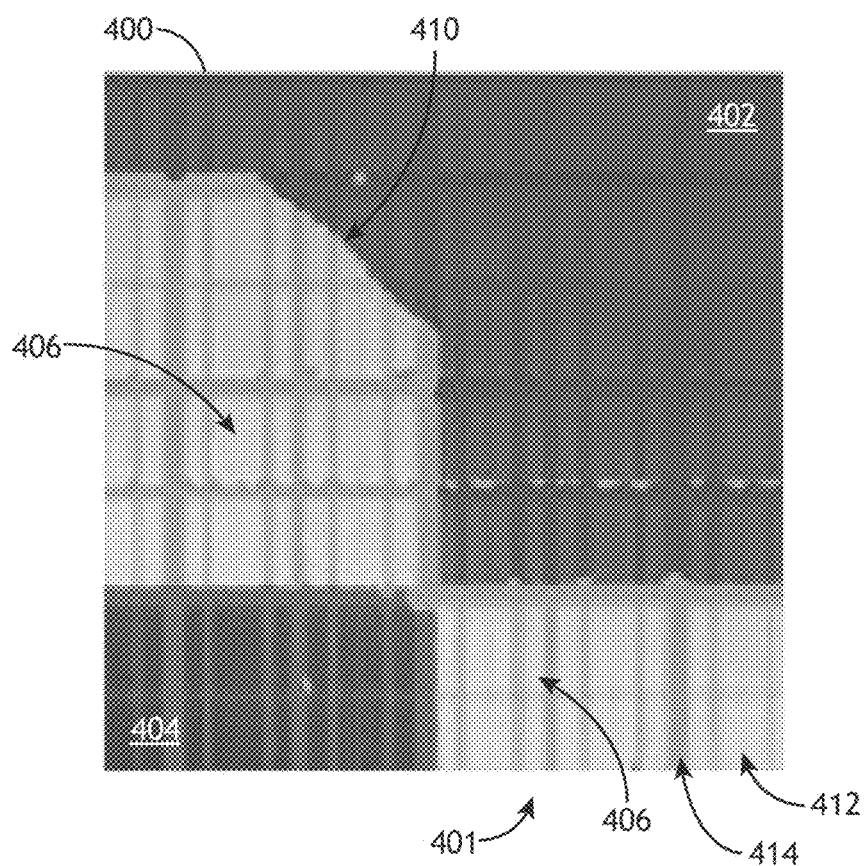
FIG. 4A is an unwrapped phase map illustrating a banding artifact associated with improper unwrapping of a wrapped phase map, in accordance with one embodiment of the present disclosure.
Figure 4B:
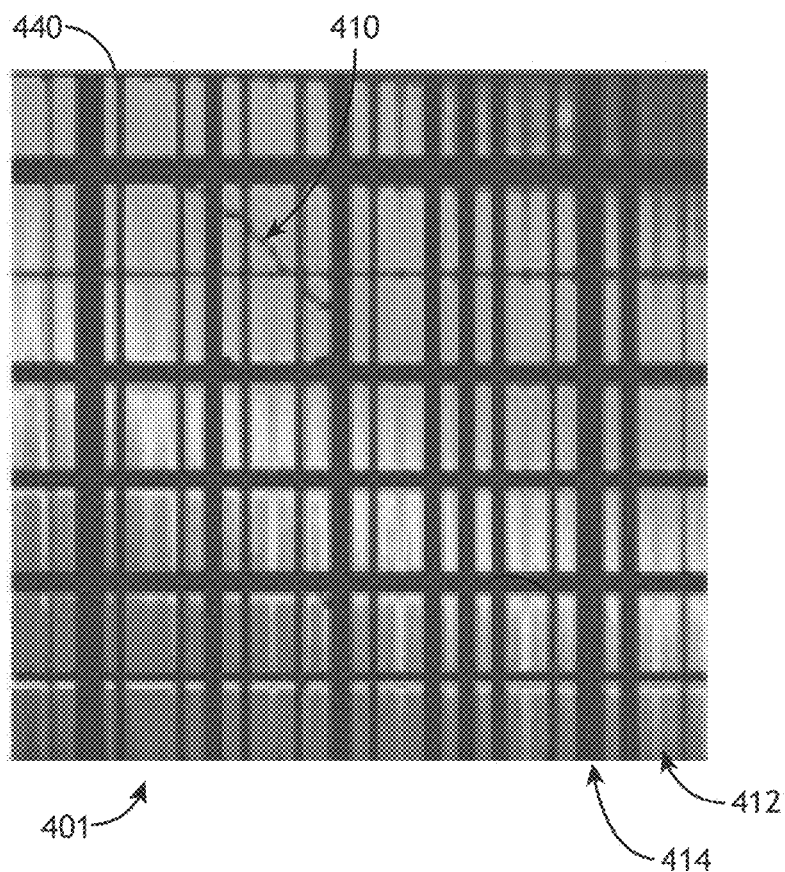
FIG. 4B is an unwrapped phase map without banding artifacts, in accordance with one embodiment of the present disclosure.

In step 306, in one embodiment, one or more patterns are defined on the wafer. It is noted herein that the fundamental purpose of a phase unwrapping procedure is to properly remove discontinuities in a wrapped phase map associated with transitions from one period to the next. Errors in this process may lead to artifacts such as, but not limited to, banding (e.g. as seen in the wrapped phase 206 in FIG. 2). Banding occurs when the wrapped phase is inappropriately adjusted by 2π, which may lead to large areas of the wafer 101 (i.e. bands) to appear offset from the surrounding wafer surface in a surface height map. It is further noted that banding may occur when unwrapping the phase of a patterned wafer 101. FIGS. 4A through 4B illustrate banding on a patterned wafer 101, in accordance with one or more embodiments of the present disclosure. FIG. 4B represents a properly unwrapped phase map 440 of a patterned wafer 401 containing a series of raised structures 412 on a flat surface 414. The height of the structures 412 continuously varies across border regions (e.g. 414) separating the structures 412. FIG. 4A represents an improperly unwrapped phase map 400 of the patterned wafer 401. A banding artifact associated with a line artifact 410 incorrectly generates multiple bands 402 and 406 separated by a surface height discontinuity.

Figure 5:
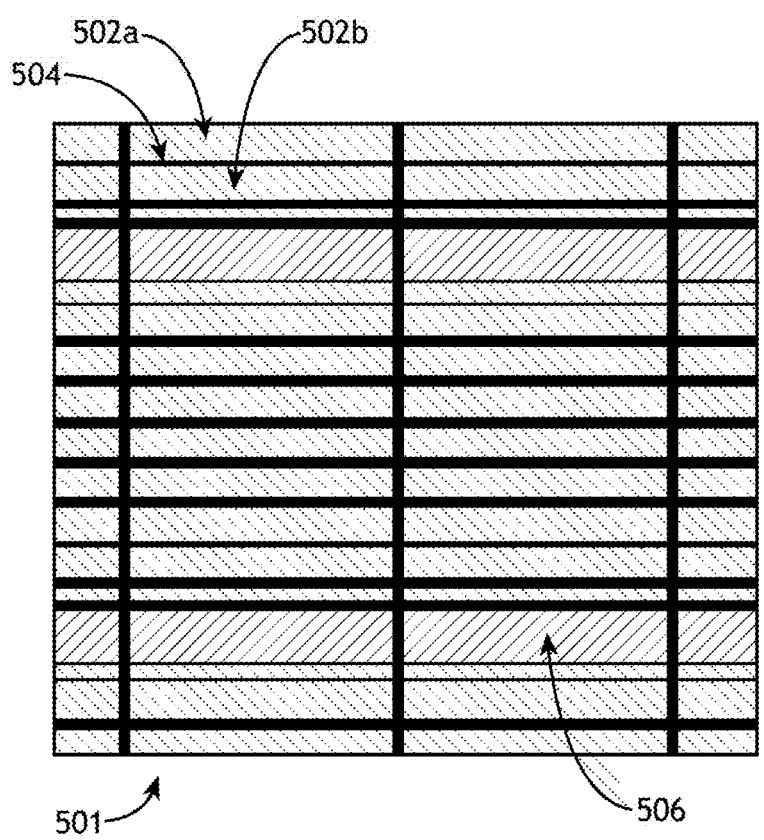
FIG. 5 is a conceptual schematic illustrating the definition of multiple structures on a patterned wafer, in accordance with one embodiment of the present disclosure.

Referring again to step 306, one or more patterns may be defined on the wafer to assist in the correction of phase discontinuities associated with the phase unwrapping process, in accordance with one or more embodiments of the present disclosure. In one embodiment, defining one or more patterns in step 306 includes one or more structures of one or more structure types. In one embodiment, a structure is the smallest regular shape region with continuous phase. FIG. 5 illustrates one or more structures 502, 504, and 506 on a patterned wafer 501 defined in step 306, in accordance with one or more embodiments of the present disclosure. It is noted herein that multiple structures of the same type may be present on the wafer 501 and that portions of the unwrapped phase map associated with structures of the same type are continuous across borders. Borders may include, but are not limited to, one or more structures of one or more different types or unpatterned areas of the wafer (e.g. street regions). For example, structures 502a and 502b are continuous across a border defined by structure 504. In another embodiment, defining one or more patterns in step 306 includes defining one or more line artifacts (e.g. 410). For example, structures 412 may be defined to be continuous across a known or observed line artifact 410. In another embodiment, one or more patterns defined in step 306 includes one or more pre-processing steps such as, but not limited to, tilt correction, to ensure border continuity between structures within the dynamic range and resolution of the system 100. It is further noted herein that one or more patterns defined in step 306 may include, but is not limited to, defining the borders between structures, defining artifacts, or defining the sign of relative height changes between structures.

Figure 6:
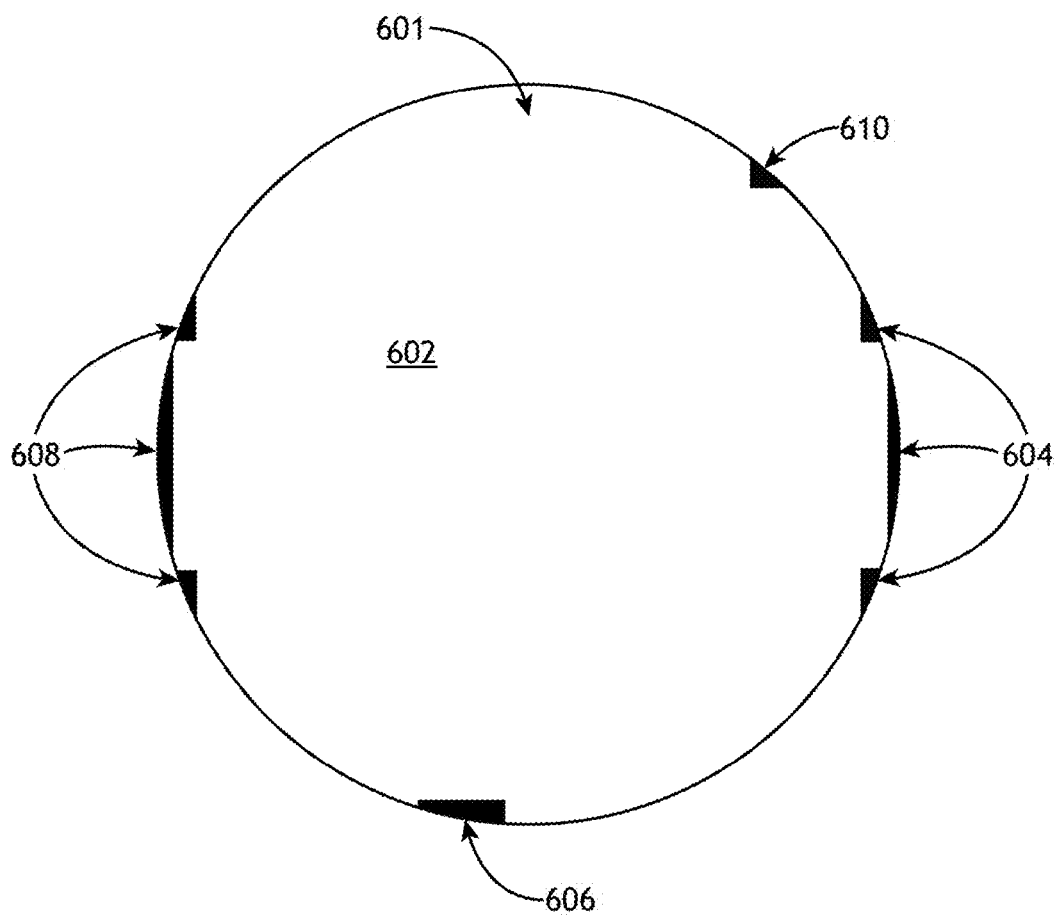
FIG. 6 is a conceptual schematic illustrating the definition of multiple segments on a wafer, in accordance with one embodiment of the present disclosure.

In another embodiment, defining one or more patterns in step 306 includes defining one or more segments, wherein a segment is a continuous region with a similar pattern of structures. FIG. 6 illustrates defining segments 602, 604, 608, and 610 on a patterned wafer 601 in step 306, in accordance with one or more embodiments of the present disclosure. In one embodiment, defining one or more patterns in step 306 includes defining a primary segment 602. In another embodiment, defining one or more patterns in step 306 includes defining one or more partial sites (e.g. 604, 606, 608, and 610).

In one embodiment, defining one or more patterns in step 306 includes defining a reference pattern of one or more structures repeated across a wafer 101 or across a segment (e.g. 602). Such a reference pattern may be referred to as a Golden Die. It is noted herein that defining a reference pattern may enable efficient definitions of one or more repeating structures. It is noted herein that a single Golden Die definition may be applied to multiple wafers. In this way, a Golden Die may be defined at the start of a production run and be applied to all wafers in the production run. In one embodiment, a Golden Die is defined during a first scan of a first wafer in a production run, which is then used during the phase unwrapping procedure for all subsequent scans in a production run.

Figure 7:
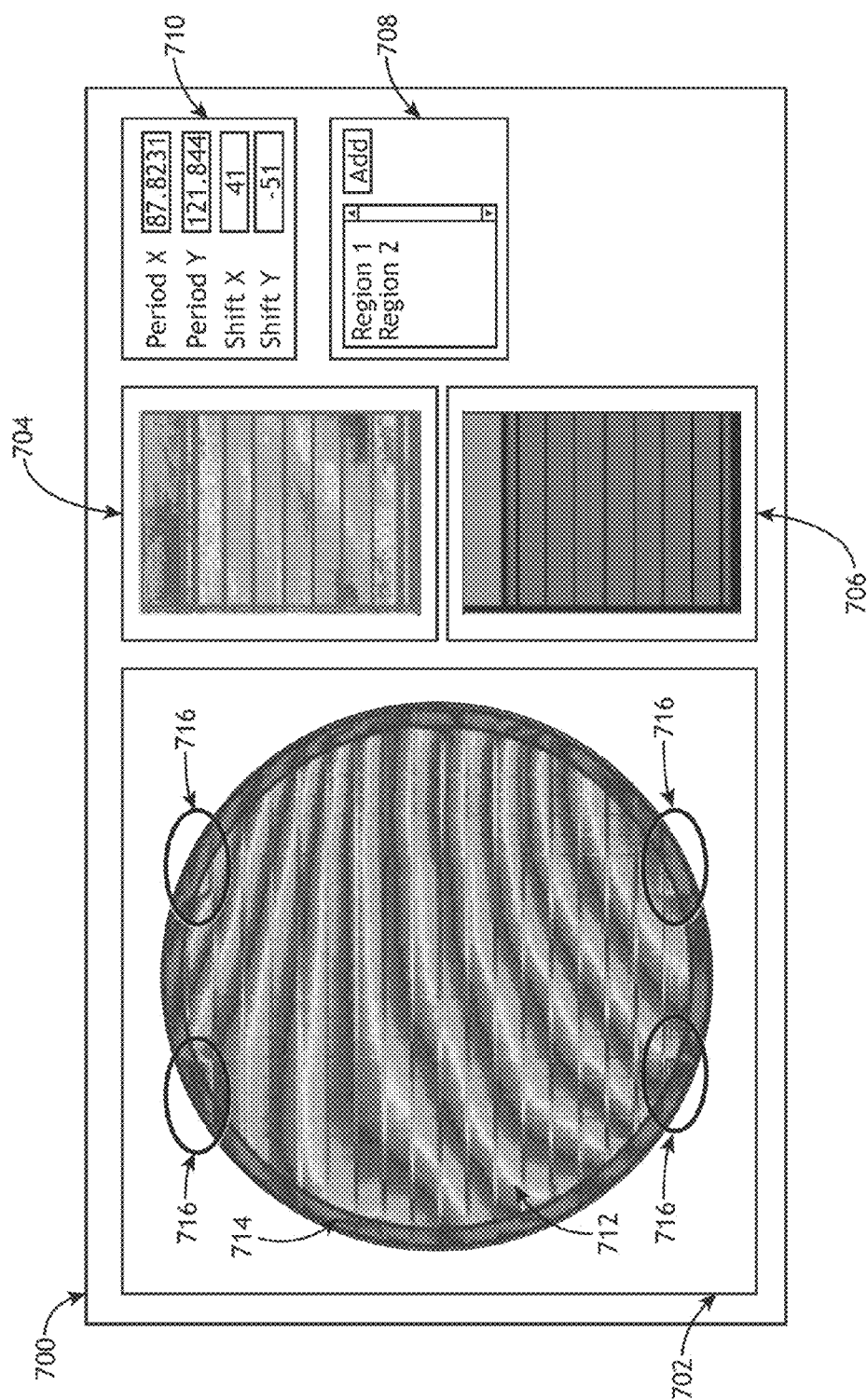
FIG. 7 illustrates a display of a graphical user interface with multiple windows suitable for defining one or more patterns on a phase map, in accordance with one embodiment of the present disclosure.

It is noted herein that step 306 of defining one or more patterns may be, but is not limited to be performed by a user, one or more image processing steps, or by a combination thereof. FIG. 7 illustrates a graphical user interface 700 (GUI) suitable for defining one or more patterns in step 306 on a wafer 101, in accordance with one or more embodiments of the present disclosure. It is noted herein that a GUI may be of any type known in the art suitable for defining one or more patterns through user input. For example, a GUI may allow a user to select and label one or more structures of one or more structure types. As another example, a GUI may allow a user to select and label one or more segments. In one embodiment, the GUI 700 includes a wafer display window 702 of the surface of the wafer 101. For example, the wafer display 702 may include an optical image of the surface of the wafer 101. As another example, the wafer display window 702 may include the wrapped phase map. As another example, the wafer display window 702 may display a mask used for the fabrication of features on the wafer 101. In one embodiment, a mask used for the fabrication of features on the wafer 101 may be selectively overlaid on top of the wrapped phase map. In another embodiment, one or more defined segments are displayed in the wafer display window 702. For example, the wafer display window 702 may include, but is not limited to a primary segment (e.g. 712), an edge band (e.g. 714), and one or more partial dies (e.g. 716).

In another embodiment, the GUI 700 includes a Golden Die display window 704. For example, the Golden Die display window 704 may include the wrapped phase map of the Golden Die. In one embodiment, the Golden Die is manually defined by the user in the GUI 700 by selecting one or more structures from the wafer display window 702. In another embodiment, the Golden Die is generated via one or more image processing steps. For example, a repeated pattern may be identified from the wafer display window 702. As another example, one or more portions of the wafer display window 702 representing one or more instances of a repeated die may be aggregated (e.g. by summing or averaging) in order to generate a low-noise Golden Die. In another embodiment, a Golden Die is generated according to the design of a wafer pattern mask used to fabricate features on the wafer. Additional adjustments such as, but not limited to, adjusting the center location, rotation, scaling, or tilt of the wafer pattern mask, may also be applied to align the wafer pattern mask to the wrapped phase map in response to an imperfectly aligned wafer.

In another embodiment, the GUI 700 includes a structure map window 706 and a structure type label window 708. A structure map window 706 may include a representation of the Golden Die such that one or more structures of one or more structure types associated with the Golden Die may be defined. In one embodiment, a map of structures of different types represented by different colors is displayed in the structure map window 706. In another embodiment, each of the one or more structure types defined in the structure map window 706 is associated with a label in a structure type label window 708. In one embodiment, labels in the structure type label window 708 are automatically generated. In another embodiment, a user may define labels within the structure label window. In one embodiment, a new structure type may be defined by first defining a label in a structure label window 708 and second select one or more regions in a structure map window 706. It is noted herein that defining one or more structures may be an iterative process.

In another embodiment, the GUI 700 includes a site information window 710. In one embodiment, a site information window 710 may include location information associated with the location of the Golden Die on the wafer 101. For example, a site information window 710 may include information about the location of the Golden Die relative to the center of the wafer 101. As another example, a site information window 710 may include the dimensions of the Golden Die.

In another embodiment, defining one or more patterns in step 306 on a wafer is performed by one or more image processing steps. In another embodiment, defining one or more patterns on a wafer in step 306 is performed by a user in combination with one or more image processing steps. As a first example, a Golden Die may be identified by one or more image processing steps and further adjusted by a user via a GUI 700. As a second example, a primary segment (e.g. 712), an edge band (e.g. 714) and one or more partial dies (e.g. 716) may be identified by one or more image processing steps. As a third example, one or more artifacts may be identified using one or more image processing steps. In one embodiment, the borders between one or more structures may be defined using one or more image processing steps and may be further adjusted by a user via a GUI 700.

Referring again to FIG. 3, in step 308, pattern-assisted phase correction is applied to the unwrapped phase map, in accordance with one or more embodiments of the present disclosure. In one embodiment, step 308 includes a sub-step 310 of correcting phase discontinuities within the one or more structures. It is noted herein that artifacts such as line artifacts (e.g. 410 seen in FIGS. 4A-4B) may lead to banding during a phase unwrapping step 304 (e.g. FIG. 4A). In sub-step 310, the phase discontinuity is removed according to the continuity definition of a structure in step 306 such that a true height map of the one or more structures may be obtained (e.g. FIG. 4B). Separately correcting phase discontinuities within each of the one or more structures may significantly improve the performance and minimize artifacts such as, but not limited to, banding. This is in part due to the definition of structures in step 306 as a region of continuous phase. Unwrapping the phase of a single structure is similar to unwrapping the phase of a continuous surface as illustrated in FIG. 2.

In another embodiment, step 308 includes a sub-step 312 of correcting phase discontinuities between one or more structures of the same type. In step 306, one or more structures are defined such that the phase of structures of the same type is continuous across one or more borders. The phase correction between neighboring structures separated by one or more borders may be performed using any method known in the art for correcting phase discontinuities. In one embodiment, the phase correction between neighboring structures separated by one or more borders is performed by solving a system of linear equations. For example, a wafer 101 may contain N neighboring structures of the same type and K neighboring borders within an area of interest (e.g. a segment or a block). It is noted herein that structures of one type may be analyzed separately by masking the wrapped phase map such that pixels not associated with the structure type of interest are masked as NaN (Not a Number) values. The phase differences at the K borders may be represented by equations 4 and 5:

$$\begin{Vmatrix} \cdots & \cdots & \cdots & \cdots & \cdots \\ 1 & \cdots & -1 & \cdots & \cdots \\ \cdots & 1 & \cdots & -1 & \cdots \\ \cdots & \cdots & 1 & -1 & \cdots \\ \cdots & \cdots & \cdots & \cdots & \cdots \end{Vmatrix} \begin{Vmatrix} \varphi_1 \\ \varphi_2 \\ \vdots \\ \vdots \\ \varphi_N \end{Vmatrix} = \begin{Vmatrix} b_1 \\ \vdots \\ b_k \\ \vdots \\ b_K \end{Vmatrix} \quad (4)$$

$$\varphi_i - \varphi_j = b_k \quad (5)$$

where each row represents one border (i.e. the phase difference between the kth border between an area i and an area j. Each row may contain only two non-zero elements, which have values of 1 and −1; further, the two non-zero elements in a given row may occupy any two columns within the row. The value of b is the rounding integer of a measured border phase difference divided by $2\pi$ such that the phase correction corrects by multiples of $2\pi$. In this way, phase correction is an optimization problem where the solution of the linear system of equations is the amount of phase correction to apply in order to maintain continuity between structures of the same type as defined in step 306. It is noted herein that rounding the value of b may provide sufficient tolerance to the phase difference estimation in the presence of signal noise. It is further noted that multiple linear equation systems may be used for wrapped phase maps with a mixture of normal and poor quality regions such that the different layers. For example, a first linear equation system with a first confidence level may be used for normal or high-quality regions of the wrapped phase map, and a second linear equation system with a second confidence level may be used for poor quality regions of the wrapped phase map. In this way, phase discontinuities between structures of the same type may be systematically removed according to the level of noise in the signal.

In another embodiment, the phase correction between neighboring structures separated by one or more borders is performed by simultaneously minimizing the phase differences of all neighboring structures in the area of interest across the one or more borders. In this way, the phase correction is structured as a minimization problem. In another embodiment, the phase correction between neighboring structures separated by one or more borders is performed by a path-following technique.

Figure 8:
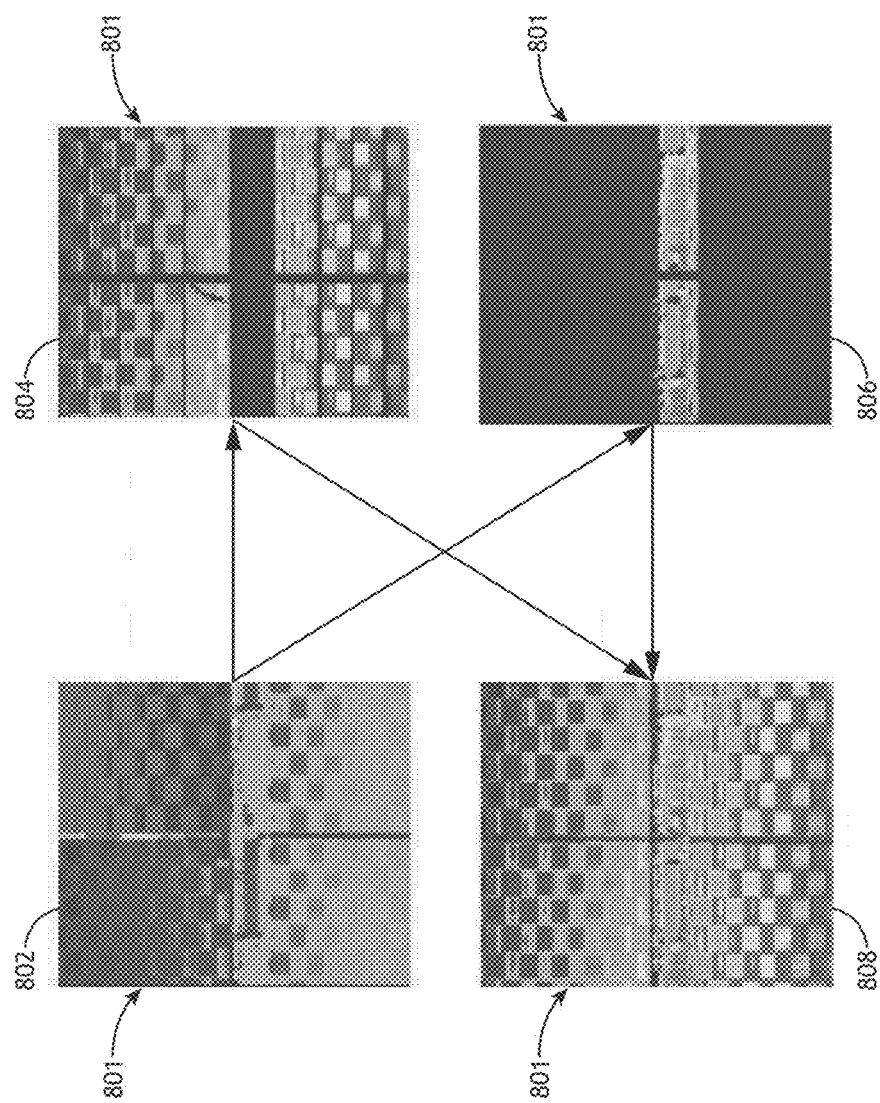
FIG. 8 is a series of images depicting the correction of phase discontinuities associated with phase unwrapping separately for two structure types and further generating a combined unwrapped phase map, in accordance with one embodiment of the present disclosure.

FIG. 8 illustrates separately unwrapping the phase for two structure types, in accordance with one or more embodiments of the present disclosure. An improperly unwrapped phase map 802 of a patterned wafer 801 contains errors associated with discontinuities between structure types and line artifacts. A masked unwrapped phase map of a first structure type is shown by 804, and a masked unwrapped phase map of a second structure type is shown by 806. A combined unwrapped phase map is shown by 808. It is noted herein that performing phase unwrapping with pattern-assisted correction accurately recreates the true unwrapped phase map of the patterned wafer 801 which is proportional to the surface height map of the patterned wafer 801.

In another embodiment, step 308 includes a sub-step 314 of correcting phase discontinuities between the one or more segments. It is noted herein that sub-step 314 may be performed using the same techniques as described for sub-step 312.

Figure 9:
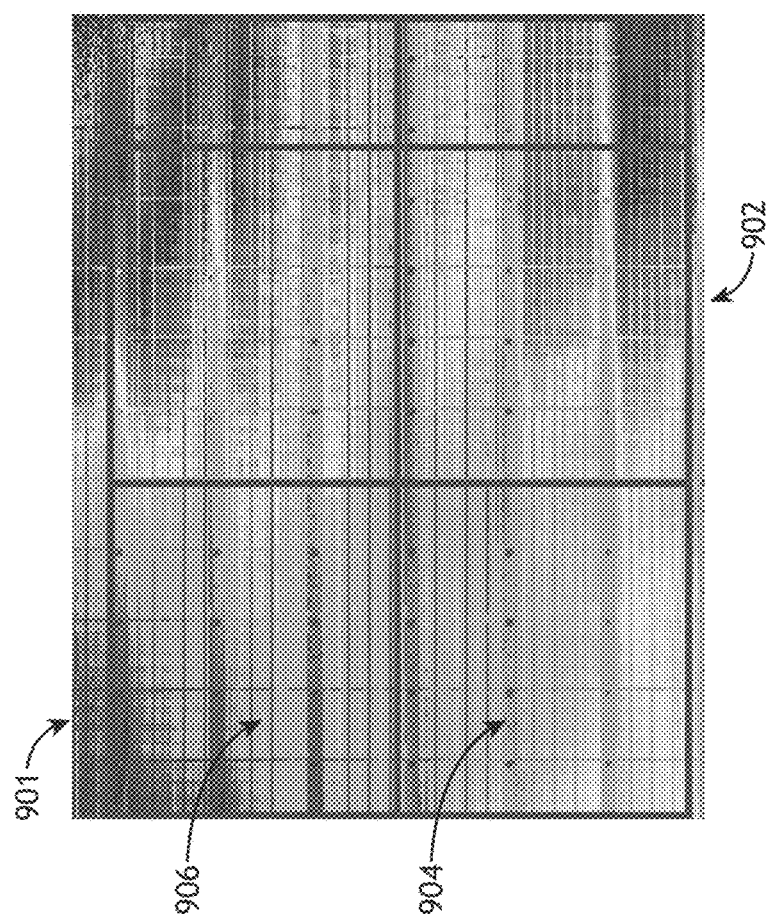
FIG. 9 is an image illustrating the definition of a block on a patterned wafer including multiple structures, in accordance with one embodiment of the present disclosure.

It is noted herein that the phase unwrapping method 300 may be further improved by first performing phase unwrapping separately on multiple regions, or blocks, of the wrapped phase map, and second correcting phase continuities between the multiple regions. For example, regional unwrapping with pattern assisted correction (RUPAC) may provide improvements such as, but is not limited to, enabling parallel processing of multiple sections of the wafer 101, facilitating debugging of the phase unwrapping process, and allowing the application of local adjustments on compact nearby regions for robustness. In one embodiment, a wrapped phase map is partitioned into one or more blocks, wherein a block is a rectangular region of pixels. FIG. 9 illustrates a block 902 including multiple structures of different types (e.g. 904 and 906) on a patterned wafer 901, in accordance with one or more embodiments of the present disclosure. Further, a block may contain portions of segments including one or more structure types. In one embodiment, adjacent blocks overlap such that one or more pixels are shared between adjacent blocks. For example, one or more blocks may have $(2\hat{}N+1) \times (2\hat{}N+1)$ pixels suitable for a minimum norm phase unwrapping algorithm with 30 pixels of overlap between adjacent pixels. It is further noted that the definition of blocks may facilitate convergence when a minimum norm phase unwrapping algorithm is applied.

In one embodiment, an unwrapped phase map is directly generated through pattern-assisted corrections of phase discontinuities without the application of a traditional phase unwrapping procedure (e.g. step 304) to the entire wrapped phase map. For example, step 304 may be omitted and any of steps 306 through 314 may be performed directly on a wrapped phase map to directly generate an unwrapped phase map. In another embodiment, a phase unwrapping procedure such as, but not limited to minimum norm, path following, Flynn Minimum Discontinuity, Quality Guided Phase Unwrapping, or Phase Unwrapping via Max Flows (PUMA) is selectively applied to one or more structures. In another embodiment, pattern information is integrated into a phase unwrapping procedure by, for example, adding a pattern constraint. In this way, any benefits of applying a phase unwrapping procedure may be obtained without applying a phase unwrapping procedure to an entire wafer. It is noted herein that directly generating an unwrapped phase map through pattern-assisted corrections or selectively applying phase unwrapping procedures may increase the speed at which wafers are analyzed.

Figure 10A:
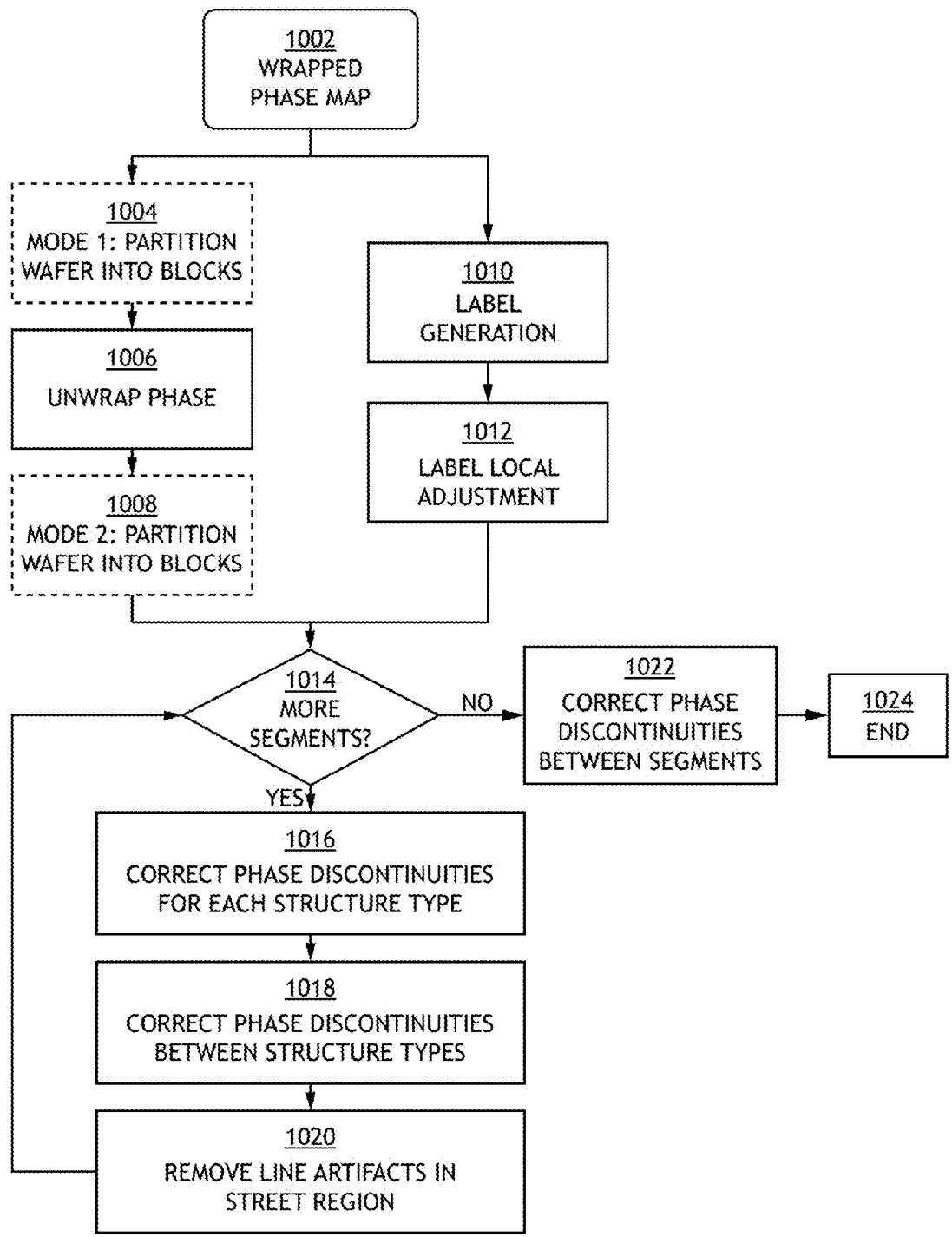
FIG. 10A is a flow diagram illustrating the programmatic flow of regional phase unwrapping with pattern-assisted corrections, in accordance with one embodiment of the present disclosure.
Figure 10B:
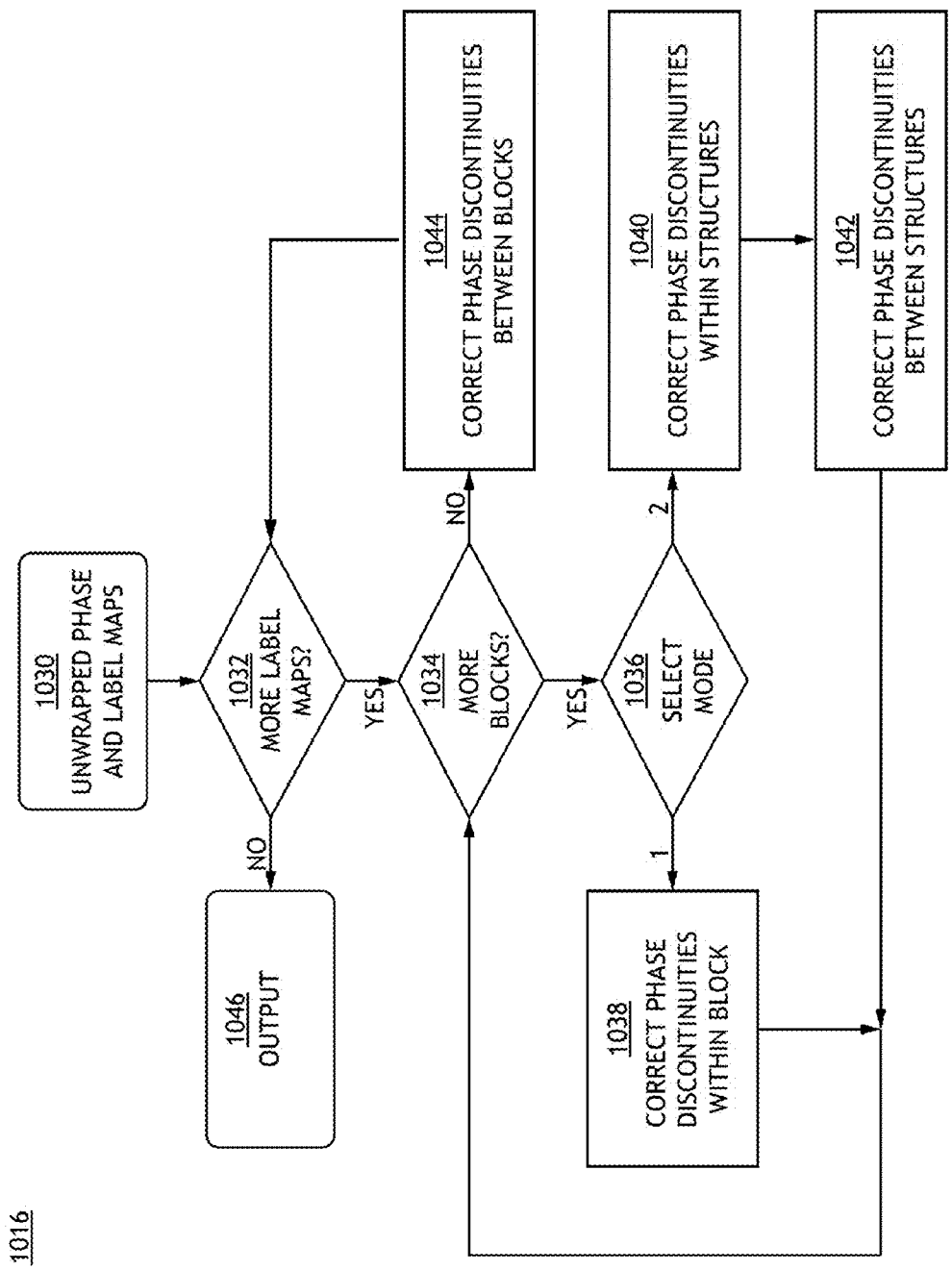
FIG. 10B is a flow diagram illustrating the correction of phase discontinuities for multiple structure types.

FIGS. 10A through 10C are flow diagrams illustrating the programmatic flow of regional unwrapping with phase-assisted correction, in accordance with one or more embodiments of the present disclosure. In one embodiment, a wrapped phase map is obtained in step 1002 (e.g. with an interferometry system 100). In another embodiment, a phase unwrapping procedure (e.g. minimum norm) is applied 1006 (e.g. by one or more processors 132 in a controller 130) to generate an unwrapped phase map. After step 1006, the unwrapped phase map may have artifacts such as, but not limited to banding.

It is noted herein that either a wrapped or an unwrapped phase map may be partitioned into one or more blocks prior to pattern-assisted phase corrections. In one embodiment, the wrapped phase map is partitioned in step 1004 into one or more blocks prior to a phase unwrapping step 1006. In another embodiment, a phase unwrapping step 1006 is applied to the wrapped phase map and the unwrapped phase map is partitioned 1008 into one or more blocks.

In one embodiment, phase discontinuities between adjacent blocks are corrected according to the one or more overlapped pixels. In this way, the phase of a first block may be adjusted in order to maintain continuity with an adjacent second block such that the one or more overlapped pixels have the same phase for each block.

In another embodiment, label maps are generated in step 1010 that represent the locations of structures on the wafer 101. In one embodiment, each structure type is associated with a label map that is the same size as the phase map. For example, each structure type may be associated with a label map with the same number of pixels as the unwrapped phase map in which structures of different types are represented by different pixel values. For example, a first label map associated with a first structure type may have pixel values of "1" corresponding to the locations of the first structure type and NaN for the remainder of pixels. As a second example, a second label map associated with a second structure type may have pixel values of "2" corresponding to the locations of the second structure type and NaN for the remainder of pixels. In one embodiment, a label map may contain all of the structure types such that each structure type is indexed to a different value.

In one embodiment, the label maps are locally adjusted in step 1012 based on a phase gradient in the wrapped phase map to generate locally adjusted label maps. For example, a local adjustment may align the boundaries of structures within a label map to locations of large phase gradient in the wrapped phase map to improve accuracy.

In one embodiment, pattern assisted correction of the unwrapped phase map is separately applied in step 1014 to one or more segments. For each segment, phase discontinuities within the segment are corrected in step 1016. In another embodiment, phase discontinuities between structure types are corrected in step 1018. It is noted herein that in many patterned wafer inspection applications, the borders between labels (i.e. the borders between different structure types) are typically step discontinuities. As such, a single phase map may not have sufficient information to generate a true unwrapped phase map that is proportional to the surface height map of a wafer 101. Additional information including, but not limited to, the relative phase difference (e.g. positive or negative corresponding to a surface rise or a surface depression) and the expected step height derived from the fabrication recipe may be used to generate a true unwrapped phase map. For example, additional information may be provided by a user (e.g. in a GUI 700 as part of a pattern definition process) or by one or more image processing steps. In another embodiment, the relative phase difference between adjacent structure types may be found using phase-shifting interferometry. In another embodiment, artifacts in street regions (e.g. regions separating one or more dies) are removed in step 1020. In one embodiment, artifacts in street regions are removed by adding or subtracting $2\pi$ based on a median value of neighboring non-artifact pixels to minimize the phase difference between the adjusted pixels and the median value of the neighboring non-artifact regions.

In one embodiment, phase discontinuities between the segments are corrected in step 1022 after all of the segments have been evaluated in step 1014. In another embodiment, the process exits in step 1024 after phase discontinuities between segments have been corrected in step 1022.

FIG. 10B is a flow diagram illustrating sub-steps associated with the adjustment of phase discontinuities for each structure type in step 1016. In one embodiment, unwrapped phase and label maps are the input to step 1016. In another embodiment, each label map associated with a structure type is processed separately in step 1032. In another embodiment, each block within a segment is separately analyzed in step 1034. In another embodiment, a method for correcting phase discontinuities within a block is selected in step 1036. In one embodiment, Mode 1, phase corrections are applied to all structures within a block. For example, phase corrections may be determined by generating and solving a system of linear equations (e.g. equations 4 and 5) including all structures with the same structure type. In another embodiment, Mode 2, multiple corrections are applied in steps 1040 and 1042. In step 1040, phase discontinuities within structures are corrected. In step 1042, phase discontinuities between structures of the same type are corrected. It is noted herein that multiple systems of linear equations with different confidence values may be solved in order to generate a true unwrapped phase map that corresponds to the surface height map of the wafer 101. Regardless of the mode, phase discontinuities between blocks are corrected in step 1044. In one embodiment, continuity between blocks is established by matching the phase of overlapping pixels of adjacent blocks. After all label maps have been processed in step 1032, the corrected phase maps for all structure types are the output in step 1046.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the disclosure is defined by the appended claims.

What is claimed is:

1. A method for performing regional phase unwrapping with pattern-assisted correction, comprising:
   acquiring a wrapped phase map of an interferogram representative of a wafer surface;
   applying a phase unwrapping procedure to the wrapped phase map to generate an unwrapped phase map, wherein the unwrapped phase map includes one or more phase discontinuities associated with phase unwrapping errors;
   defining one or more patterns in the unwrapped phase map, wherein the one or more patterns comprise two or more structures, wherein defining the one or more patterns includes determining continuity conditions for the unwrapped phase map across one or more borders separating two or more structures of a same type; and
   correcting the phase discontinuities in the unwrapped phase map based on the continuity conditions for the one or more patterns.

2. The method of claim 1, wherein the correcting the phase discontinuities in the unwrapped phase map based on the continuity conditions for the one or more patterns comprises:
   correcting the phase discontinuities within the one or more structures.

3. The method of claim 2, wherein the correcting the phase discontinuities within the one or more structures includes correcting one or more phase discontinuities associated with one or more line defects on the wafer.

4. The method of claim 1, wherein the correcting the phase discontinuities in the unwrapped phase map based on the continuity conditions for the one or more patterns comprises:
 correcting the phase discontinuities between the one or more structures.

5. The method of claim 1, wherein the one or more patterns further comprise:
 one or more segments comprising one or more structures.

6. The method of claim 5, wherein the correcting the phase discontinuities in the unwrapped phase map based on the continuity conditions for the one or more patterns comprises:
 correcting the phase discontinuities between the one or more segments.

7. The method of claim 1, further comprising:
 prior to correcting the phase discontinuities in the unwrapped phase map based on the continuity conditions for the one or more patterns, dividing the unwrapped phase map into one or more blocks such that the correcting phase discontinuities in the unwrapped phase map based on the one or more defined patterns is performed separately on the one or more blocks, wherein adjacent blocks include one or more overlapped regions; and
 adjusting the relative phase between the one or more blocks based on the overlapped regions.

8. The method of claim 1, further comprising:
 generating a surface height map of the wafer surface based on the unwrapped phase map.

9. The method of claim 1, wherein the one or more patterns further comprise:
 one or more relative phase differences between adjacent structures of different types.

10. The method of claim 1, further comprising:
 prior to correcting the phase discontinuities in the unwrapped phase map based on the continuity conditions for the one or more patterns, registering the unwrapped phase map to the one or more patterns, wherein registering includes adjusting at least one of the center position, rotation, or magnification of the unwrapped phase map.

11. The method of claim 1, wherein the applying a phase unwrapping procedure to generate an unwrapped phase map includes the application of at least one of a Minimum Norm procedure, a path following procedure, a Flynn Minimum Discontinuity procedure, a Quality Guided Phase Unwrapping procedure, or a Phase Unwrapping via Max Flows procedure.

12. A wafer metrology system with region phase unwrapping with pattern-assisted correction, comprising:
 an interferometer sub-system configured to generate an interferogram representative of a wafer surface, wherein the interferometer sub-system includes a detector configured to capture the interferogram; and
 a controller communicatively coupled to the detector, the controller including one or more processors configured to generate an unwrapped phase map with pattern-assisted corrections, wherein the one or more processors are configured to execute one or more instructions configured to cause the one or more processors to:
  generate a wrapped phase map of the interferogram;
  apply a phase unwrapping procedure to the wrapped phase map to generate an unwrapped phase map, wherein the unwrapped phase map includes one or more phase discontinuities associated with phase unwrapping errors;
  define one or more patterns on the unwrapped phase map associated with one or more features on the wafer, wherein the one or more patterns comprise two or more structures, wherein defining the one or more patterns includes determining continuity conditions for the unwrapped phase map across one or more borders separating two or more structures of a same type; and
  correct the phase discontinuities in the unwrapped phase map based on the continuity conditions for the one or more patterns.

13. The system of claim 12, wherein correcting the phase discontinuities in the unwrapped phase map based on the continuity conditions for the one or more patterns comprises:
 correct the phase discontinuities within the one or more structures.

14. The system of claim 13, wherein correcting the phase discontinuities within the one or more structures includes correct one or more phase discontinuities associated with one or more line defects on the wafer.

15. The system of claim 12, wherein correcting the phase discontinuities in the unwrapped phase map based on the continuity conditions for the one or more patterns comprises:
 correct the phase between the one or more structures.

16. The system of claim 12, wherein the one or more patterns further comprise:
 one or more segments comprising one or more structures.

17. The system of claim 16, wherein the one or more segments include at least one of a primary segment, one or more edge bands, or one or more partial die regions.

18. The system of claim 16, wherein correcting the phase discontinuities in the unwrapped phase map based on the continuity conditions for the one or more patterns comprises:
 correct the phase between the one or more segments.

19. The system of claim 12, further comprising:
 an additional interferometer sub-system configured to generate an additional interferogram, wherein an additional intensity map of the additional interferogram corresponds to a modulated representation of an additional wafer surface, wherein the one or more processors of the controller are further configured to generate an additional unwrapped phase map of the additional wafer surface.

20. The system of claim 12, wherein an unwrapped phase map comprises:
 one or more blocks such that the one or more processors are further configured to execute one or more instructions configured to cause the one or more processors to correct the phase discontinuities in the unwrapped phase map based on the one or more patterns separately for the one or more blocks, wherein adjacent blocks include one or more overlapped regions; and
 adjust the relative phase between the one or more blocks based on the overlapped regions.

21. The system of claim 12, wherein the one or more patterns further comprise:

one or more relative phase differences between adjacent structures of different types.

22. The system of claim 12, wherein the one or more patterns further comprise:
a golden die image, wherein the golden die image represents a unit cell of one or more structures periodically repeated on the wafer.

23. The system of claim 22, wherein the golden die image is based on a wafer pattern mask.

24. The system of claim 22, wherein the golden die image is generated by identifying a periodic arrangement of one or more structures defining a unit cell.

25. The system of claim 12, further comprising:
one or more display devices, wherein the one or more processors are further configured to display at least one of an unwrapped phase map, a golden die, a structure map, one or more labels of one or more structure types on the one or more display devices.

26. The system of claim 12, further comprising:
one or more user input devices, wherein the one or more processors are further configured to receive signals indicative of user input, wherein the user input includes at least one of assigning a label to a structure type or associating one or more regions of the unwrapped phase map with one or more structures.

27. The system of claim 12, further comprising:
prior to correcting the phase discontinuities in the unwrapped phase map based on the continuity conditions for the one or more patterns, registering the unwrapped phase map to the one or more patterns, wherein registering includes adjusting at least one of the center position, rotation, or magnification of the unwrapped phase map.

28. The system of claim 12, wherein the applying a phase unwrapping procedure includes the application of at least one of a Minimum Norm procedure, a path following procedure, a Flynn Minimum Discontinuity procedure, a Quality Guided Phase Unwrapping procedure, or a Phase Unwrapping via Max Flows procedure.

29. The system of claim 12, wherein correcting the phase discontinuities in the unwrapped phase map based on the continuity conditions for the one or more patterns comprises:
generating a system of equations describing phase differences between the two or more structures of the same type across the one or more borders based to the continuity conditions; and
solving the system of equations to determine phase corrections to correct the phase discontinuities in the unwrapped phase map.

30. The system of claim 29, wherein the system of equations comprises: a system of linear equations.

31. The system of claim 12, wherein correcting the phase discontinuities in the unwrapped phase map based on the continuity conditions for the one or more patterns comprises:
simultaneously minimizing phase differences between the two or more structures of the same type across the one or more borders within a selected minimization tolerance to correct the phase discontinuities in the unwrapped phase map.

32. The system of claim 12, wherein correcting the phase discontinuities in the unwrapped phase map based on the continuity conditions for the one or more patterns comprises:
determining phase corrections to correct the phase discontinuities in the unwrapped phase map using a path-following technique.

33. A wafer metrology system with pattern-assisted phase unwrapping, comprising:
an interferometer sub-system configured to generate an interferogram representative of a wafer surface, wherein the interferometer sub-system includes a detector configured to capture the interferogram; and
a controller communicatively coupled to the detector, the controller including one or more processors configured to generate an unwrapped phase map, wherein the one or more processors are configured to execute one or more instructions configured to cause the one or more processors to:
generate a wrapped phase map of the interferogram;
define one or more patterns on the wrapped phase map associated with one or more features on the wafer, wherein the one or more patterns comprise two or more structures, wherein defining the one or more patterns includes determining continuity conditions for the wrapped phase map across one or more borders separating two or more structures of a same type, and
correct the phase discontinuities in the wrapped phase map based on the continuity conditions for the one or more patterns.

34. The system of claim 33, wherein the one or more processors are further configured to:
apply a phase unwrapping procedure to at least one of the one or more structures prior to the correct the phase discontinuities in the wrapped phase map based on the continuity conditions for the one or more patterns.

* * * * *